June 10, 1969 W. SHULTZ 3,448,642
SLIDE TOOL
Filed Aug. 2, 1966 Sheet 1 of 5
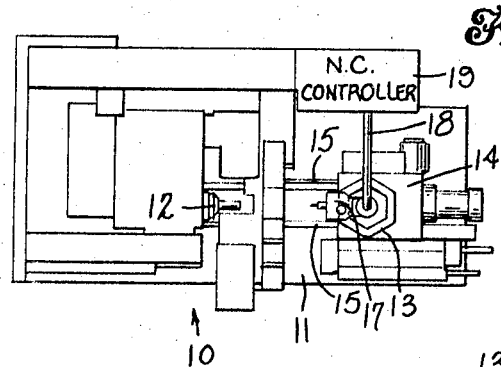
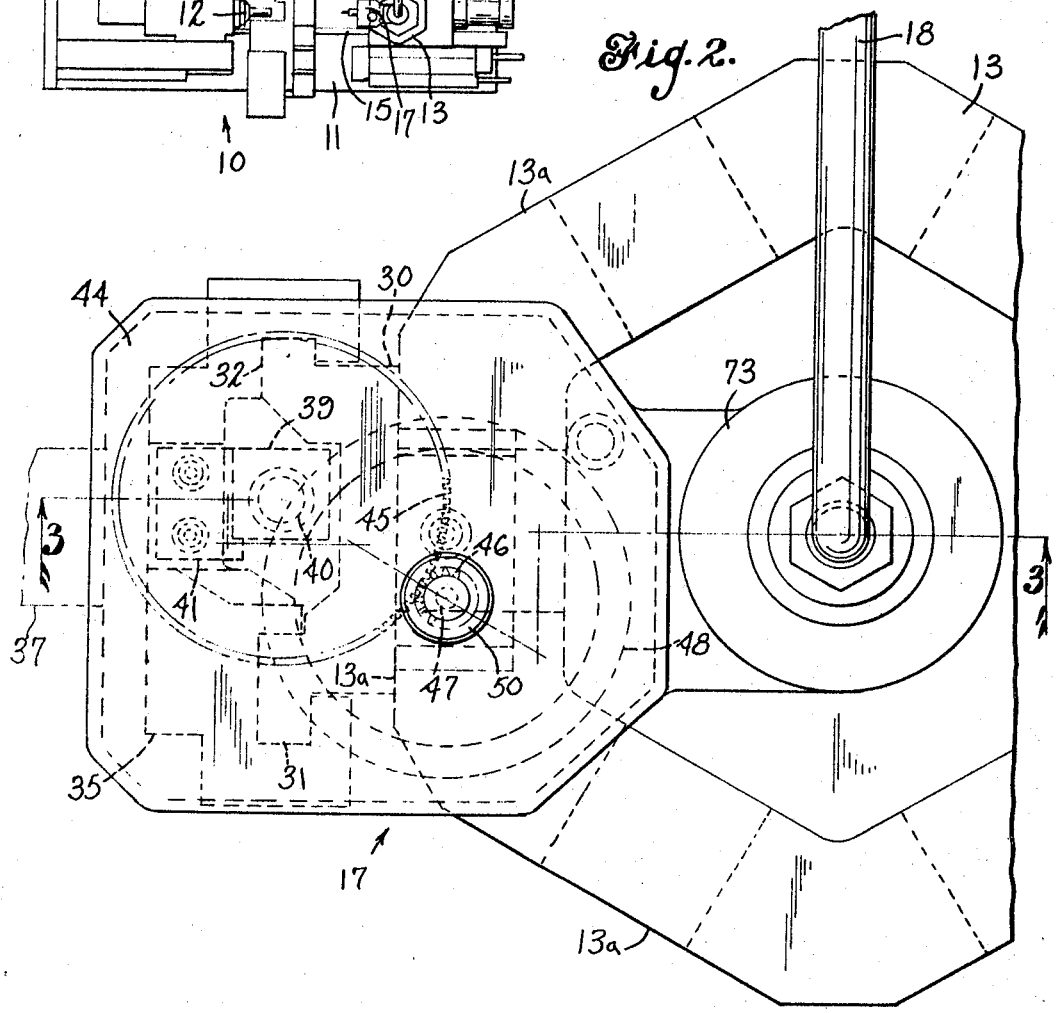
INVENTOR
Walter Shultz
BY DeLio and Montgomery
ATTORNEYS

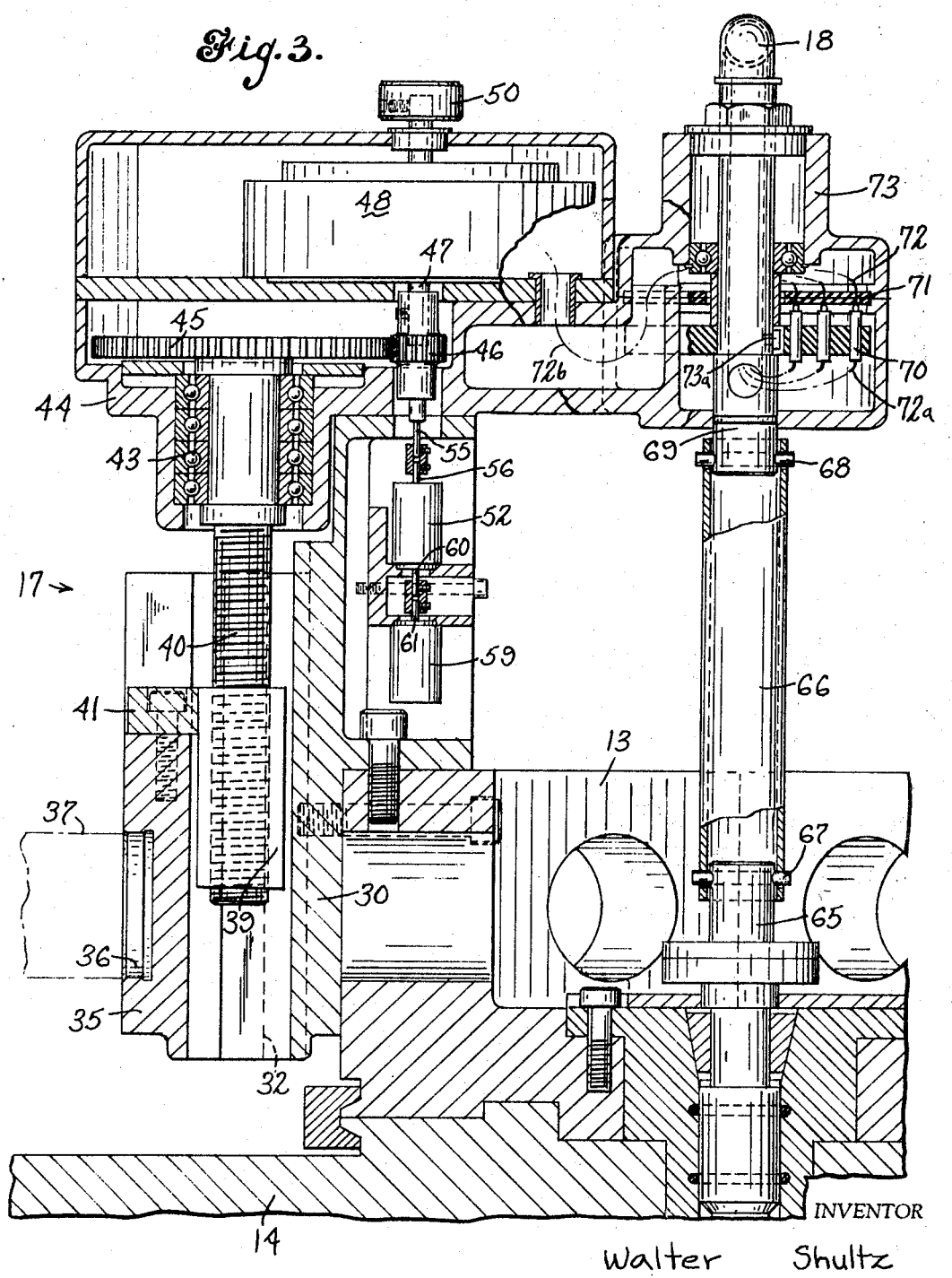

June 10, 1969 W. SHULTZ 3,448,642
SLIDE TOOL
Filed Aug. 2, 1966 Sheet 3 of 5
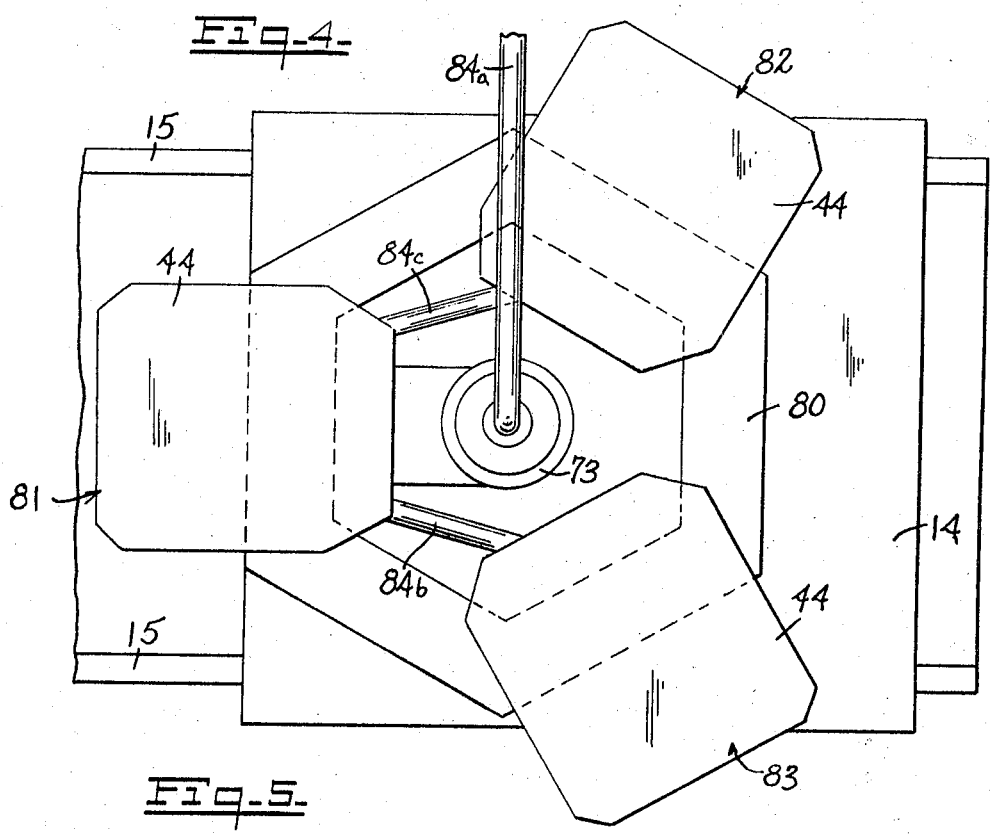
Fig-4.
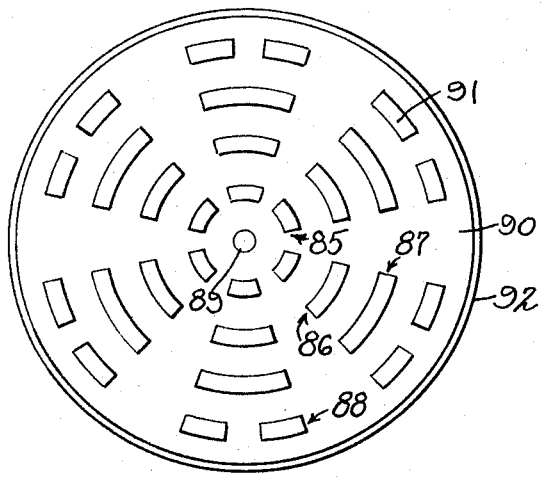
Fig-5.
Fig-6.
INVENTOR
Walter Shultz
BY DeLio and Montgomery
ATTORNEYS

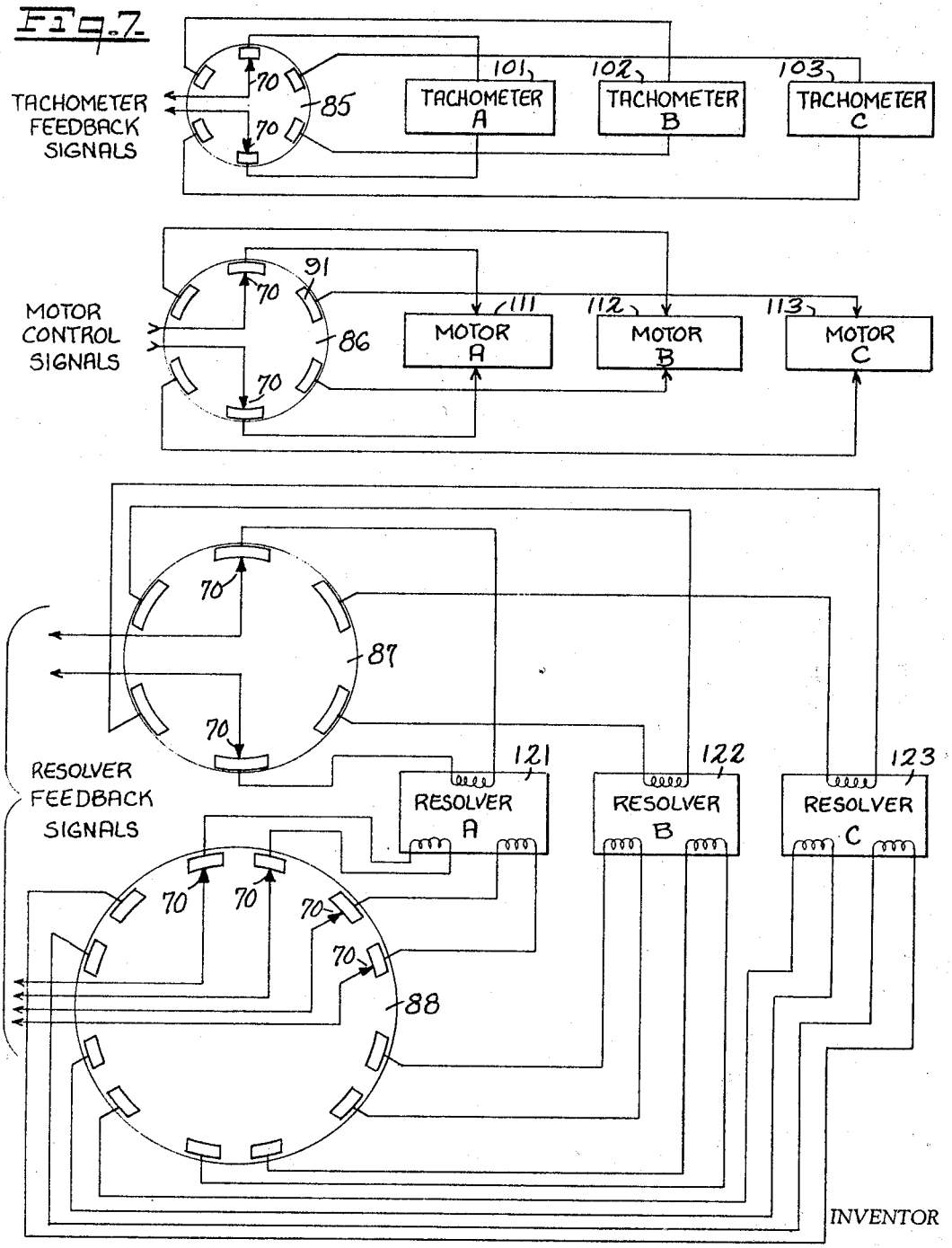

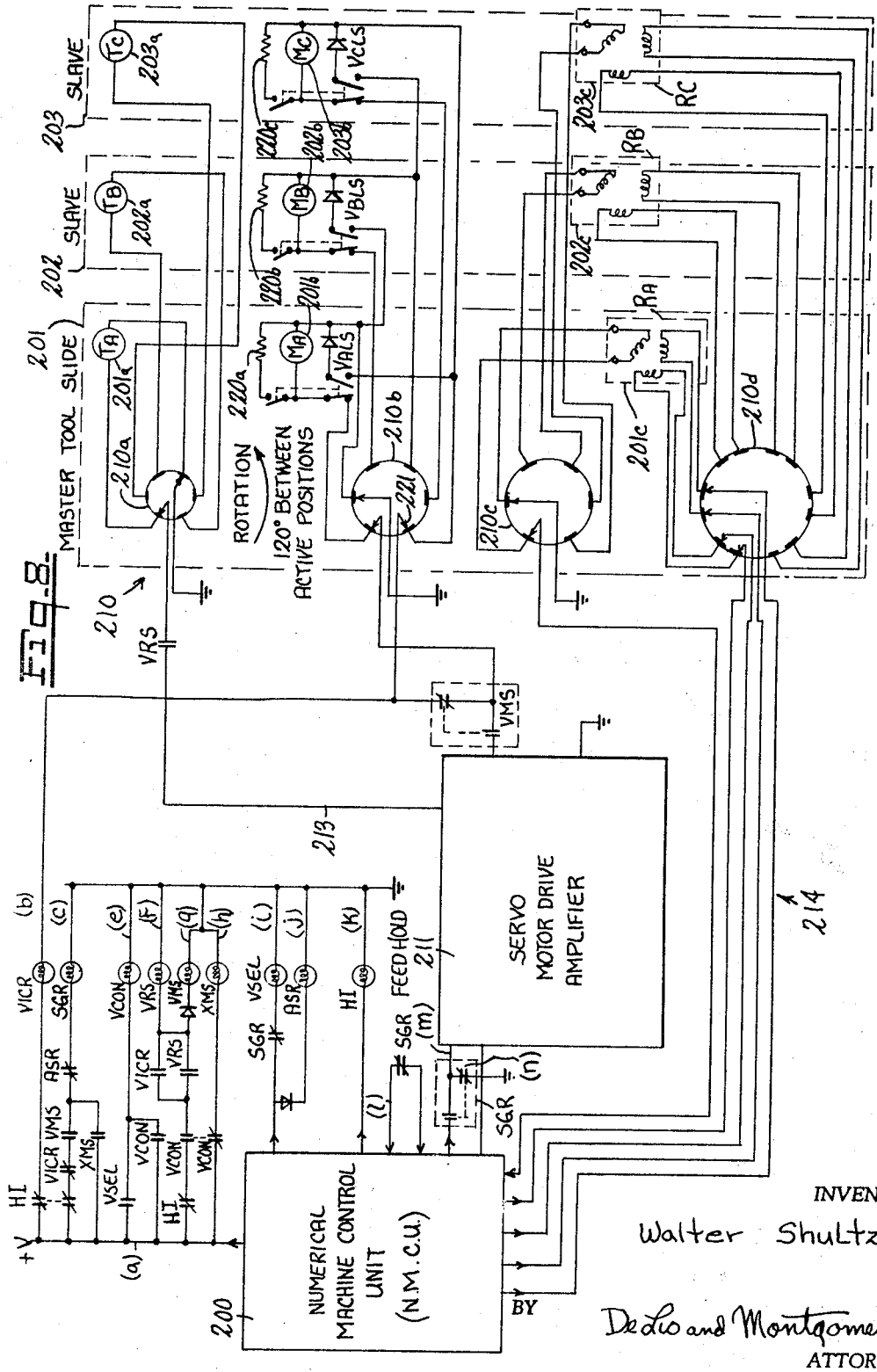

United States Patent Office 3,448,642
Patented June 10, 1969

3,448,642
SLIDE TOOL
Walter Schultz, Newport, N.H., assignor to Textron, Inc., Providence, R.I., a corporation of Rhode Island
Filed Aug. 2, 1966, Ser. No. 569,663
Int. Cl. B23b *21/00, 39/20;* B23p *23/02*
U.S. Cl. 82—21                                14 Claims

ABSTRACT OF THE DISCLOSURE

An automatic slide tool attachment adapted to be mounted on the turret of a turret lathe. The slide tool attachment includes a support mounted on the turret of a turret lathe, the support having a tool holder structure which is movable with respect to the support. In addition, there is provided a commutation structure for providing power to a motor to move said tool holder structure.

---

This invention relates to machine tools and more particularly to an automatic slide tool adapted to be mounted on a turret lathe, and further adapted to respond to numerical control information.

As numerically controlled machine tools have become more widely used in industry, there has been a great demand that these machines be capable of performing more versatile machining operations. In particular, there has been a great demand for numerically controlled turret lathes capable of providing four axes of motion so as to accomplish intricate machining operations.

In the past, turret lathes have generally been limited to motion along three axes. Although it has been proposed that the turret of a turret lathe be moved vertically to provide a fourth axis of motion, this approach has been found to be quite costly, particularly if it was desired that all present numerically controlled lathes be modified to incorporate such a feature. Moreover, it is not always required that each and every tool mounted on the turret be adapted to be moved vertically. Consequently, a simpler and less costly means for controlling a tool is desirable.

Accordingly, to meet the needs of the machine tool industry, applicant has provided a self-contained compact slide tool arrangement, adapted to accept numerical control information and which is in the form of an attachment to the turret of a turret lathe. This invention further provides commutation means adapted to supply the power and control needs of three such slide tool arrangements mounted on a single turret of a turret lathe.

It is therefore an object of this invention to provide a new and improved turret lathe adapted to provide a fourth axis of motion.

Another object of this invention is to provide a new and improved slide tool attachment adapted to be mounted on the turret of a turret lathe.

Another object of the invention is to provide a new and improved slide tool attachment adapted to be numerically controlled.

A further object of the invention is to provide a new and improved turret lathe slide tool attachment responsive to numerically controlled information and adapted to be readily mounted on or removed from existing turret tool mounting surfaces.

A still further object of the invention is to provide a new and improved commutation means adapted to co-operate with the turret of a turret lathe to provide a path for power and control signals to a plurality of slide tool attachments.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

For a fuller understanding of the invention, reference should be had to the following description taken in conjunction with the accompanying drawings, in which:

FIG. 1 is a diagrammatic top view of a machine tool for utilizing the invention;

FIG. 2 is an enlarged top view showing the slide tool attachment according to the invention;

FIG. 3 is a sectional view taken along line 3—3 of FIG. 2;

FIG. 4 is a top view showing a plurality of slide tool attachments according to the invention, mounted on a turret of a turret lathe;

FIG. 5 is a bottom view of a commutation means according to the invention;

FIG. 6 is a side view of FIG. 5 according to the invention;

FIG. 7 is a schematic diagram illustrating means for providing control and feedback signals to and from the slide tool attachment according to the invention; and FIG. 8 is a schematic diagram illustrating means for testing to determine if control signals should be transmitted to the slide tool attachment.

Referring to FIG. 1, there is disclosed a top diagrammatic view of a machine tool, such as a turret lathe. The lathe is generally shown at 10 and includes a frame 11 having positioned thereon a headstock spindle and chuck arrangement 12 for holding and rotating a workpiece. Positioned adjacent to the arrangement 12 is a hexagonal turret 13 mounted on a saddle 14 which is movable toward and away from the chuck arrangement 12 along guide rails 15. The slide tool attachment according to the invention is generally shown at 17 and is mounted on one of the faces of the hexagonal turret 13. The power to control attachment 17 is provided through the conduit 18 which, in turn, is intercoupled to the numerical controller (shown in block diagram) 19. Means are also provided, such as in heretofore prior art lathes, for indexing the turret in accordance with the information from the numerical controller 19.

Referring now to FIGS. 2 and 3, there is shown in more detail the slide tool attachment according to the invention. The attachment 17 is shown comprising a member 30 adapted to be supported from one face of the hexagonal turret 13. The member 30 is coupled to face 13*a* of the hexagonal turret 13 and a portion thereof extends over the top of the face 13*a*. The member 30 is provided with a pair of guide rails 31 and 32, in a manner so as to guide a tool holder 35 having means at 36 for holding a tool shown at 37. In order to position tool holder 35 vertically, a nut 39 driven by a ball screw 40 is provided. The nut 39 has coupled thereto an appendage 41 which is fixedly secured to the tool holder 35 such that, as the ball screw 40 is rotated, the tool holder 35 will be vertically positioned. The ball screw 40 is supported in bearings 43 of an upper housing 44 supported by member 30. The ball screw 40 is driven through a gear 45 which is itself in turn driven by a gear 46 mounted on a shaft 47 of an electric motor 48. The shaft 47 is hand-rotatable by the provision of a member 50 extending outwardly from the housing 44, such that if desired the tool holder 35 may be manually positioned.

In order to determine the position of the tool holder with respect to the workpiece, there is provided a resolver 52 coupled through shafts 55 and 56 to drive shaft 47 of the motor 48. Thus the exact position of the tool holder 35 may be determined. A tachometer 59 provides a feedback signal indicative of the velocity of the shaft 47. The tachometer is intercoupled to shaft 47 through shafts 60 and 61, respectively.

The turret 13 is indexed or rotated through means (not shown) well known in the prior art. There is supported by the turret 13 a shaft 65 which is connected to a hollow shaft 66 through pin 67. The shaft 65 is held by the turret 13 such that it remains stationary as the turret is indexed about it. This is accomplished by a bearing mounted in the turrent 13. The shaft 66 is in turn coupled through a pin 68 to another shaft 69. The shaft 69 provides a conduit for electrical leads 72a containing information provided through conduit 18 from the controller 19 to be distributed to brushes which are shown at 70. The shaft 69 is held stationary through its connection to stationarily-held conduit 18. It is to be understood that means may be provided in the saddle (not shown) supporting the turret to maintain the shaft 69 stationary as the turret rotates. The brushes 70 engage a disc-type commutator 71 having a conductive material pattern formed thereon to selectively provide control signals to the motor 48 through leads 72b coupled to the disc 71 as well as to retrieve feedback information provided from the resolver 52 and the tachometer 59. The leads 72a coupled to brushes 70 are themselves coupled external the lathe through a top portion of shaft 69. The disc 71 is supported in a housing 73 which is in turn supported on member 30 in a manner such that it will rotate with the housing 73 as the turret is indexed. The brushes 70 are supported from the shaft 69 by a key 73a, such that they will remain stationary as the turret is indexed.

Thus, as the turret is indexed the brushes which remain stationary will engage selective conductive patterns formed on the disc 71 as the disc 71 rotates with the turret 13 to provide electrical information to the motor 48 and, further, provide feedback information to the controller through leads connected to the resolver and the tachometer.

Referring now to FIG. 4, there is shown a hexagonal turret 80 adapted to support three slide tool attachments 81–83. Electrical incoming and outgoing signals are coupled to the various slide tool attachments 81–83 through a conduit 84a by way of a disc-type commutator shown in the subsequent diagrams. The commutator is of the type shown in FIG. 3 and is supported as a part of one of the slide tool attachments shown at 81 and termed as the master. Electrical signals are provided from the disc-type commutator to the other attachments termed as slaves through conduits shown at 84b and 84c, respectively. In this manner a single commutator disc supported by a master slide tool attachment 81, provides electrical signals to the slave slide tool attachments 82 and 83. It is to be understood that by the use of the commutating disc as shown, other electrical connections could be made to various positions of the turret, if desired.

FIGS. 5 and 6 show a commutated disc having a plurality of tracks 85–88 thereon positioned concentrically about a center point of rotation 89. The disc preferably comprises an insulated portion 90 with a conductive metallic coating such as copper forming the conductive pattern as shown in FIG. 5. The conductive segments are shown at 91 and may be formed by the usual photo-etch techniques or by other prior art techniques. A stiffener material could be used at 92 for providing added rigidity, if required.

The electrical connections are made through the various conductive elements by boring in from the top side of the disc and then connecting wires by soldering, for example, to each of the conductive elements 91. If desired, rotary coupling means could be used to connect each of the wires to insure that the wires would not become disconnected during use. The copper coating of the conductive pattern of the disc is shown more clearly in FIG. 6. The conductive pattern of the disc is so arranged that when used with the turret of a turret lathe, a separate grouping of conductive members in each track will be indexed to interconnect a particular attachment to the numerical control previously mentioned. In this manner, by indexing the turret, not only is the attachment selected, but the particular electrical conductive pattern is selected to permit the energizing of the attachment motor.

Referring now to FIG. 7, there is shown in schematic form a plurality of tachometers, motors and resolvers which may be used to drive the attachments 81–83 as well as provide feedback information to the numerical controller to indicate the position of the tool coupled to the attachment. The particular schematic diagram of FIG. 7 may be used with the grouping of three attachments as shown in FIG. 4. Tachometers for monitoring the speed of rotation of the shaft of the drive motor are shown at 101–103, motors for positioning the tool are shown at 111–113, and resolvers for determining the position of the attachment and the tool which it carries, with respect to the workpiece, are shown at 121–123, respectively. Each of the tachometers, motors and resolvers are interconnected electrically to particular conductive segments of the conductor tracks 85–88, shown in FIG. 5. Information is provided to, as well as extracted from the tachometers, motors and resolvers by the position of stationary brushes shown at 70. As can be seen from FIG. 7, the conductive patterns are particularly set up or arranged so that as the turret is indexed a particular attachment will not only be positioned to effect working of a workpiece, but will simultaneously index the commutator so that a particular arrangement or grouping of conductive patterns will be interdisposed between the brushes and the resolver, motor and tachometer, such that a particular attachment will be in condition for use to position a tool with respect to the workpiece.

It should be understood that if desired, when the case may arise, the brushes may be made movable and the discs held stationary, so long as there is relative motion between the two, such that when the turret is indexed the correct attachment would be in position to be controlled from the numerical controller.

It will thus be seen that an easily attachable slide tool or grouping of slide tools may be affixed to the turret of a turret lathe without actually reconstructing the turret lathe itself. Additionally, as seen, the electrical signals required to operate the attachment or group of attachments can easily be provided by the expedient of an indexable commutating disc.

Referring now to FIG. 8, there is shown a diagram illustrating the connection of a numerical machine control unit 200 to the drive and control systems of a master tool slide 201 and two slave tool slides 202 and 203. The tool slides 201–203 are each provided with tachometers 201a–203a, DC motors 201b–203b and resolvers 201c–203c, respectively. These tachometers, motors and resolvers are coupled to a disc-type distributor commutator 210 having discs 210a–210d with stationary brushes inter connecting the disc tracks to the drive and control circuitry, according to the invention. The commutator 210 is of the type described in conjunction with FIGS. 5–7 of this application.

In this figure there is also shown a servo motor drive amplifier 211, machine control unit 200 and the commutator 210. The amplifier operates on and amplifies the motor control signals provided from control unit 200. There is also shown coupled to the amplifier 211 a feedback path 213 for providing information from the tachometers 201a–203a to control the speed of the motors 201b–203b. The amplifier 211 may be of the type disclosed in copending application Ser. No. 517,320 filed Dec. 29, 1965 in the name of Schoonover and assigned to the assignee of this invention, or may be any other suitable servo amplifier system.

FIG. 8 further shows resolver signal paths 214 from discs 210c and 210d for permitting resolvers 201c–203c to provide an indication of the position of slides 210-203 to the machine control unit 200.

Referring to the upper left-hand portion of FIG. 8, there is shown a parallel circuit comprising a plurality of relay coils and contacts for controlling the energization of motors 201b–203b as well as the feedback of tachometer signals to the amplifier 211.

Each of the relay coils and the associated contacts will be described in conjunction with the switching sequence for providing signals to the master and slave tool slides. Each of the series circuits making up the parallel circuit in the drawing are identified by paths *a–n*, so as to simplify the explanation of the circuit operation. Initially each of the HI contacts are closed, which indicates that the turret has been indexed. During indexing, the HI coil (path *k*) is energized by the control unit to open the HI contacts (in paths *b* and *c*) to prevent power from being applied to the motors 201b–203b and thus prevent shorting of the power supply as the brushes move from segment to segment on the discs of the commutator 210. The VICR coil (path *b*) is normally energized whenever the power is on (through path *a*) and when the commutator brushes contact the segments of each track in the proper aligned configuration. Thereafter, the numerical machine control unit 200 provides a signal to energize the relay coil XMS (path *h*) which connects up the X axis motor (not shown) as well as energizing the SGR (path *c*) coil. The X axis motor is coupled to the portion of the machine which positions the X axis slide mounted on an entirely separate machine member from that on which the hexagon turret is mounted. Hence the X axis motor of this machine forms no part of the instant invention and the description of the operation of the X axis is not included herein although its operation is well understood from the prior art.

When power is turned on, the SGR coil (path *c*) is energized through the XMS contact and accordingly the SGR contact (in paths *i, l, n*) open and the contacts in path M close to remove the machine servo amplifier ground and at the same time remove feed-hold from the control unit 200. At this time the X axis motor is ready to operate.

In order to switch to V axis control, the machine control unit 200 energizes the V select line (path *i*) which in turn energizes the ASR coil (path *j*). This action in turn opens the relay contacts ASR (path *c*) to de-energize the SGR coil. This again brings on machine control unit feed-hold and grounds the amplifier and allows the V select coil (path *i*) to be energized.

The energizing of the V select coil permits the V connect coil (path *e*) to be energized and in turn holds itself on through a V connect contact which bypasses path *e*. The energization of the VCON coil (path *e*) opens the VCON contact (path *h*) which de-energizes XMS (path *h*) and simultaneously energizes the coil VMS (path *g*). This causes the relay contact VMS (path *c*) to close due to the energization of the coil VRS (path *f*) through the contact VICR which brings in the VRS contact (path *g*).

The energizing coils VRS and XMS connect the tachometers and the V axis motor to the amplifier 211. Additionally, the energizing of the VMS coil opens the VICR coil circuit (path *b*) so that the SGR coil (path *c*) is re-energized. Again the SGR coil removes the contact unit 200 feed-hold and amplifier 211 ground, making the V axis active.

Indexing the turret merely causes an interruption of connections to the V axis to prevent noise and shorts caused by the brushes brushing commutator segments. The SGR contacts are dropped first, followed by the VRS contacts and then the actual mechanical index takes place followed by making VRS and then SGR active, thus again restoring the V axis to an active condition.

The VICR control relay is used to assure that proper conditions exist before the switch-over to the V axis is made. This is accomplished by looking back along the motor leads to ascertain if a motor is there. If the motor has negligible resistance, it can be used as a short circuit to ground the VICR coil (follow path *b* until the VMS contact is reached, which is normally closed except when the VMS coil is energized, and back through the brushes coupled to the disc 210b from the VICR coil). When operating properly, the VICR coil is energized whenever power is on and allows the VMS coil to be energized which in turn drops out the VICR coil and the action of both allow the SGR relay to pick up. It will be noted that the VICR relay is always de-energized to complete the hook-up of the V axis. If the V axis goes beyond its normal travel limits, limit switches $V_aLS$, $V_bLS$ and $V_cLS$ provided across the motors 201b–203b, respectively, are actuated. The limit switches open the power leads to motors 201b–203b and place resistors across the armature of the motor to rapidly stop it. The resistors are shown at 220a–220c. For example, the limit switch $V_aLS$ closes a circuit through a borrowed motor segment (on disc 210b) through brush 221 back to the VICR coil just ahead of the VMS contacts. Thus, the VICR coil is again grounded. When this condition exists, the SGR coil contacts are dropped and the feed-hold is on and the amplifier is grounded, thus preventing signals from being applied to the V axis motors.

Another function of the VICR relay is to disallow the hooking up of the circuitry if the turret is in between slide tool positions or if no slide tool is present. This is of course accomplished by the fact that no circuit exists under these conditions to ground the VICR relay. Consequently the VRS and the VMS relays cannot be energized.

This completes a description of the VICR relay and its associated contacts in the circuitry according to this invention.

It will thus be seen that the objects set forth above, among those made apparent from the preceding description, are efficiently attained and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language might be said to fall therebetween.

What is claimed is:

1. A machine tool comprising means for holding a workpiece to be machined, a turrent adapted to hold a plurality of tools in selected tool holder means positioned about said turret, said turret being indexable to position one of said tool holder means in working relationship with respect to said means for holding a workpiece, slide tool means mounted at one of said tool holder means, said slide tool means comprising a member affixable to said tool holder means, a tool holder structure movable with respect to said member and a motor supported by said member and having means coupled thereto for moving said tool holder structure with respect to said member.

2. A machine tool according to claim 1, wherein said slide tool member has guideways mounted thereon, wherein said tool holder structure includes means for mating with said guideways, and wherein said means coupled to the motor for moving said tool holder structure includes a nut coupled to said tool holder structure and a ball screw for driving said nut.

3. A machine tool according to claim 1, including commutating means adapted to be indexed with the turret for providing an electrical path for control signals to be applied to said motor.

4. A machine tool according to claim 3, including a tachometer and a resolver driven by said motor and electrically coupled to said commutating means.

5. A machine tool according to claim 3, wherein a plurality of slide tool means is mounted at different ones of said tool holder means of said turret, wherein said commutator comprises a disc which is indexable with the indexing of said turret, and wherein said disc includes a plurality of conductive patterns positioned thereon for selectively permitting the energization of one of said slide tool means.

6. A slide tool attachment adapted to be mounted on a face of a multi-faced turret of a turret lathe, said slide tool attachment comprising a support member adapted to be mounted on a face of the turret, said support member having guideways mounted thereon, a tool holder member having means for supporting a tool and also including means for mating with said guideways, a motor supported in a housing mounted on said support member, and means coupled to said motor to position said tool holder member with respect to the face of the turret.

7. A slide tool attachment according to claim 6, including a nut coupled to said tool holder member and a ball screw for driving said nut, said ball screw coupled to said motor through a pair of gears, one of said gears mounted on a shaft of said motor.

8. A slide tool attachment according to claim 6, including a commutator disc indexable with the turret of the turret lathe, said commutator disc having a conductive material pattern thereon, some of said conductive pattern coupled to said motor, and brushes stationary with respect to the disc for making electrical contact with selected conductive material portions of said disc.

9. A slide tool attachment according to claim 8, wherein said commutator disc is positioned in a housing supported by said support member, and wherein said brushes are supported by said turret.

10. A machine tool having an indexable turret, the improvement comprising a master slide tool attachment mounted on said turret and positionable with the indexing of the turret, and commutating means supported by said master slide tool attachment and indexable with the indexing of the turret to selectively provide electrical control signals to said master attachment, said master slide tool attachment having a motor, a resolver and a tachometer which are coupled to said commutating means.

11. A machine tool in accordance with claim 10, wherein said commutating means includes a disc having a conductive pattern positioned thereon, said disc rotatable with said turret, and a plurality of brushes for engaging the conductive pattern on said disc.

12. A machine tool in accordance with claim 11, including a slave slide tool attachment mounted on said turret, said commutating means of said master providing electrical control signals to said slave attachment through said master slide tool attachment.

13. In an indexable turret lathe machine having a turret, a tool positioning motor supported by the turret, a disc commutator with a plurality of spaced conductive segments spaced about a disc surface and a plurality of brushes capable of being selectively positioned on said segments to permit control signals to be applied to said tool positioning motor from a control means comprising means for preventing control signals to be applied to said tool positioning motor in the event the disc segments are incorrectly positioned with respect to the brushes.

14. In an indexable turret lathe machine according to claim 13, wherein a tool is mounted on a slide supported by said turret and wherein means are provided for preventing control signals to be applied to the tool positioning motor in the event the tool slide has moved a distance greater than a predetermined maximum distance.

References Cited

UNITED STATES PATENTS 2,347,791   5/1944   Onrud _____ 29—40
2,629,468   2/1953   Jelinek et al. _____ 29—64

GERALD A. DOST, *Primary Examiner.*

U.S. Cl. X.R

77—25, 33.4; 29—38; 90—13